United States Patent [19]

Menk et al.

[11] 4,352,765

[45] Oct. 5, 1982

[54] METHOD FOR PRODUCING RUBBER ARTICLES BY SUBJECTING POWDERED CAOUTCHOU COMPOSITION TO INTENSIVE MIXING AND HIGH-SPEED ELECTRONS

[75] Inventors: Hermann Menk, Bodolz; Michael Kempter, Munich, both of Fed. Rep. of Germany

[73] Assignee: Metzeler Kautschuk GmbH, Munich, Fed. Rep. of Germany

[21] Appl. No.: 173,764

[22] Filed: Jul. 30, 1980

[30] Foreign Application Priority Data

Aug. 4, 1979 [DE] Fed. Rep. of Germany ....... 2931793

[51] Int. Cl.³ .................... C08J 7/16; C10M 3/22; B29H 5/26; B29C 1/04
[52] U.S. Cl. ........................ 264/22; 204/158 HE; 204/159.12; 204/159.2; 204/160.1; 264/25
[58] Field of Search ............ 264/22, 25; 204/158 HE, 204/160.1, 159.12

[56] References Cited

U.S. PATENT DOCUMENTS

| | | | |
|---|---|---|---|
| 3,084,115 | 4/1963 | Smith et al. ................ | 204/159.12 |
| 3,098,808 | 7/1963 | Anderson ..................... | 204/160.1 |
| 3,231,481 | 1/1966 | Amemiya et al. ............ | 204/160.1 |
| 3,330,748 | 7/1967 | Lawton ........................ | 204/160.1 |
| 3,843,502 | 10/1974 | Pearson et al. ............. | 204/159.18 |
| 3,936,365 | 2/1976 | Saunders et al. ............ | 204/159.2 |
| 4,220,512 | 9/1980 | Bohm et al. ................. | 204/159.12 |

FOREIGN PATENT DOCUMENTS

| | | |
|---|---|---|
| 1074524 | 4/1980 | Canada . |
| 1358209 | 7/1974 | United Kingdom . |
| 1507691 | 4/1978 | United Kingdom . |

OTHER PUBLICATIONS

Derwent Abst. 06834y/04, J51144473, (12-11-76) Shinetsu Chem.
Chem. Abst., vol. 79-137837d, (1973), Bowers et al., "Irradiation Cure Processing of Elastomeric Components", SA72-05367.

*Primary Examiner*—Melvyn I. Marquis
*Assistant Examiner*—Herbert J. Lilling
*Attorney, Agent, or Firm*—Herbert L. Lerner; Laurence A. Greenberg

[57] ABSTRACT

Production of rubber articles by intensively mixing powdered caoutchouc and additives without vulcanizing accelerators to produce a homogenized caoutchouc mixture. The mixture is formed into semi-finished products which are irradiated with high-speed electrons to produce the rubber articles.

12 Claims, 1 Drawing Figure

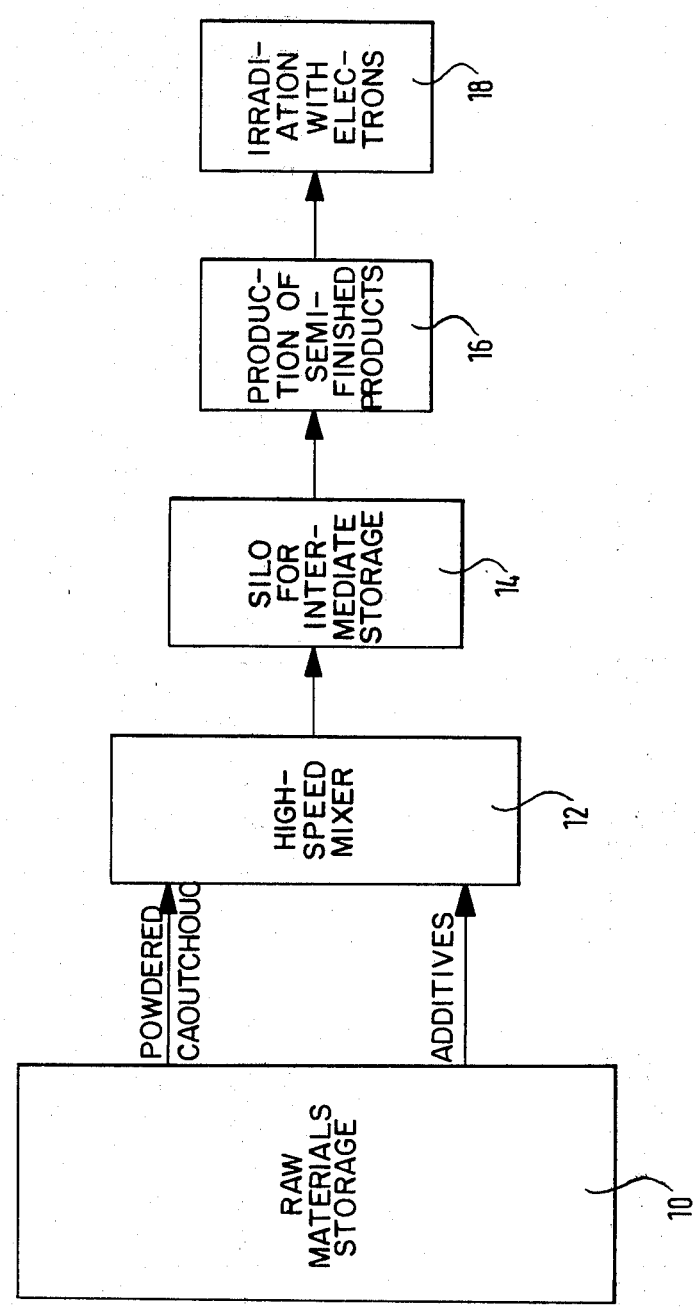

METHOD FOR PRODUCING RUBBER ARTICLES BY SUBJECTING POWDERED CAOUTCHOU COMPOSITION TO INTENSIVE MIXING AND HIGH-SPEED ELECTRONS

BACKGROUND OF THE INVENTION

1. Field of the Invention

This invention relates to a method for producing rubber articles by cross-linking a caoutchouc mixture based upon powdered caoutchouc.

2. Description of the Prior Art

In the manufacture of rubber articles from the usual baled caoutchouc (bale-caoutchouc), first the so-called "batches" are produced in a kneader. Thereafter, the auxiliary vulcanization agents are mixed-in on a roller, before the actual shaping is done, for example, in an extruded or calender.

The use of powdered caoutchouc for the production of rubber articles was based upon an attempt to save expensive mixture-components and, at the same time, to reduce the time required to produce the raw mixture.

In order to save on the required mixing apparatus, e.g. the kneader and the roller, the so-called "powdered caoutchouc" was developed. In the production of rubber articles from this powdered-caoutchouc, the raw material mixture is melted in a mixer-extruder, mixed and thereafter processed in a compactor to obtain the required density of at least 1.0 g/cm$^3$. However, the mixer-extruder as well as the compactor can process the powdered caoutchouc mixture only relatively slowly, because the friction forces generated at a rapid process speed cause a strong temperature rise, and thereby the danger exists, that the powdered caoutchouc mixture containing the vulcanization accelerators "jumps" into the reaction state.

It was found in practice, however, that the use of powdered caoutchouc did not produce the expected results, mainly because it was necessary to use the total amount of raw materials, called for in the mixture-formula, right from the start of the production of the mixture. However, in the case of sulphur cross-linking, a mixture of this kind contains accelerators or, in the case of C-C cross-linking, organic peroxides, these materials can be subjected only to slight increases in temperature, since as soon as a specific temperature limit is exceeded, the mixture becomes activated. This leads to premature cross-linking or vulcanization, after which rubber articles can no longer be produced.

This method also did not prove to be successful in practice, due to the fact that two mixing machines were required, i.e. the mixer-extruder and the compactor, and furthermore, that the process speed of the powdered caoutchouc mixture must be kept very low, because of the explained danger to "jump" into the reaction state.

Another disadvantage of this known method for producing rubber articles from powdered caoutchouc is that it is impossible to process a quantity of loose mix-ingredients directly into a semi-finished product, for example by extrusion or calendering; instead the mixture must first pass through a so-called "compactor" which reduces the density of the mixture from about 0.5 g/cm$^3$ to the necessary maximum of at least 1.0 g/cm$^3$. This additional operation not only complicates the known method, but also increases the total processing time.

SUMMARY OF THE INVENTION

It is, therefore, an object of the invention to provide a method for producing rubber articles of the kind in question in which the above-mentioned disadvantages do not arise. More particularly, the method in accordance with the invention will allow rubber articles to be produced more rapidly and therefore more economically.

With the foregoing and other objects in view, there is provided in accordance with the invention a method for producing rubber articles which comprises subjecting powdered caoutchouc and additives in the absence of vulcanizing accelerators to intensive mixing to produce a thoroughly homogenized caoutchouc mixture which will produce a rubber article on cross-linking, and irradiating the caoutchouc mixture with high-speed electrons to cross-link the caoutchouc mixture.

Further, in accordance with the invention, the caoutchouc mixture is made into semi-finished products, and the semi-finished products are then irradiated with high-speed electrons.

Other features which are considered as characteristic for the invention are set forth in the appended claims.

Although the invention is illustrated and described herein as embodied in a method for producing rubber articles, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description of specific embodiments when read in connection with the accompanying drawing which diagrammatically illustrates the manufacture of rubber articles by the method according to the invention with a block-diagram wherein powdered caoutchouc and additives from raw materials storage are introduced into a high-speed mixer to form a homogenized caoutchouc mixture, which latter goes to intermediate storage for subsequent use. The caoutchouc mixture is formed into semi-finished products by calendering or extruding, and then irradiated with high-speed electrons.

DETAILED DESCRIPTION OF THE INVENTION

The advantages achieved with the invention are based mainly upon the fact that powdered-caoutchouc mixtures, which are to be cross-linked by the irradiation with high-speed electrons produced for example by a known electron beam generator, contain neither sulphur and other vulcanizing accelerators, nor organic peroxides. In theory, therefore, there is no upper temperature limit to heat-treatment of a caoutchouc mixture of this kind; in practice, an upper temperature limit is imposed by the amount of heat that the other components of the mixture can withstand, but this is substantially higher than with conventional mixtures which contain cross-linking initiators.

Because of their great ability to withstand heat, therefore, caoutchouc-mixtures of this kind, based upon powdered caoutchouc and containing no cross-linking initiators, may be intensively mixed in a so-called "high-speed mixer" available for this purpose which insures very thorough mixing but involves a considerable increase in temperature. This increase in temperature, inadmissible for known caoutchouc mixtures, decreases the viscosity of the mixture, allowing the mixing to be carried out in a shorter time, and thus producing a highly homogeneous caoutchouc mixture in a very short time. A substantial shortening of the overall processing time is thus achieved. Thus, the increase in temperature due to intensive mixing while a disadvantage in earlier processes is of positive benefit in the method of the present invention.

Moreover, no compactor is needed, since the high-speed mixer already imparts the necessary density to the mixture based upon powdered caoutchouc.

The hitherto usual "mixing-up" roll may also be dispensed with, since processing in the high-speed mixer already produces a mixture of the desired consistency.

Upon leaving the high-speed mixer. The caoutchouc mixture may be stored, if required, for an unlimited period of time, should it be impossible to proceed with the manufacture of semi-finished products in known manner, with no danger of the said mixture becoming activated. This is impossible with existing mixtures based upon powdered caoutchouc since, as already mentioned, they contain cross-linking initiators which, under certain circumstances, activate the mixture even at a slight increase in temperature.

And finally, semi-finished products may also be made, if necessary, by high-temperature calendering or extrusion. This makes it possible to influence the properties of rubber articles by appropriate heat-treatment.

The invention is explained hereinafter in conjunction with an example of embodiment, and with the block-diagram of the drawing illustrating the manufacture of rubber articles by the method according to the invention.

Powdered caoutchouc, and the necessary additives, are drawn from raw-materials store 10 and are passed to a high-speed mixer 12 which, in a very short time, produces a highly homogeneous mixture of the said substances. Such additives for mixing with powdered caoutchouc to produce mixtures for rubber articles are conventional.

The finished mixture, based upon powdered caoutchouc, passes from the high-speed mixer 12 to a silo 14 where it can be stored for almost any length of time, if this is necessary for production reasons.

The required amount of the caoutchouc mixture is withdrawn as needed from the silo 14 and is processed, by extrusion or calendering, into a semi-finished product, as indicated diagrammatically at 16. This preformed, as yet unvulcanized, rubber article, for example a profile or strip, is then passed in front of an electron-beam generator which irradiates it with high-speed electrons, thus cross-linking the caoutchouc into rubber and producing a conventionally resilient article.

There is claimed:

1. A method for producing rubber articles from powdered caoutchouc containing compositions which comprises subjecting a powdered caoutchouc containing composition for producing a rubber article which composition does not contain any vulcanization accelerators to thorough mixing at an elevated temperature in a high-speed mixer to produce an intermixed, homogeneous caoutchouc mixture which will produce a rubber article on cross-linking, and irradiating the homogeneous caoutchouc mixture with high-speed electrons to cross-link the caoutchouc mixture.

2. A method according to claim 1, wherein said powdered caoutchouc composition which does not contain any vulcanization accelerators is mixed at a temperature between 80° and 160° C.

3. A method according to claim 1, wherein said powdered caoutchouc composition which does not contain any vulcanization accelerators is mixed at a temperature between 110° and 140° C.

4. A method according to claim 2, wherein said powdered caoutchouc composition which does not contain any vulcanization accelerators is heated before the mixing.

5. A method according to claim 2, wherein said powdered caoutchouc composition which does not contain any vulcanization accelerators is heated during the mixing.

6. A method according to claim 2, wherein said powdered caoutchouc composition which does not contain any vulcanization accelerators is heated before and during the mixing.

7. A method according to claim 2, wherein said mixing produces frictional heat which is used to increase the temperature, at least in part, of said powdered caoutchouc composition which does not contain any vulcanization accelerators within the range of 80° and 160° C. during mixing.

8. A method according to claim 1, wherein said powdered caoutchouc composition which does not contain any vulcanization accelerators is made into semi-finished products, and wherein the semi-finished products are then irradiated with high-speed electrons.

9. A method according to claim 2, wherein said powdered caoutchouc composition which does not contain any vulcanization accelerators is made into semi-finished products, and wherein the semi-finished products are then irradiated with high-speed electrons.

10. A method according to claim 7, wherein said powdered caoutchouc composition which does not contain any vulcanization accelerators is made into semi-finished products are then irradiated with high-speed electrons.

11. A method according to claim 8, wherein said powdered caoutchouc composition which does not contain any vulcanization accelerators is calendered to produce said semi-finished products.

12. A method according to claim 8, wherein said powdered caoutchouc composition which does not contain any vulcanization accelerators is extruded to produce said semi-finished products.

* * * * *